(12) United States Patent
Claytor (10) Patent No.: US 7,187,505 B2
(45) Date of Patent: Mar. 6, 2007

(54) IMAGING LENS FOR INFRARED CAMERAS

(75) Inventor: Richard N. Claytor, Arlington, TX (US)

(73) Assignee: Fresnel Technologies, Inc., Ft. Worth, TX (US)

( * ) Notice: Subject to any disclaimer, the term of this patent is extended or adjusted under 35 U.S.C. 154(b) by 86 days.

(21) Appl. No.: 10/681,005

(22) Filed: Oct. 7, 2003

(65) Prior Publication Data

US 2004/0141241 A1 Jul. 22, 2004

Related U.S. Application Data (60) Provisional application No. 60/416,624, filed on Oct. 7, 2002.

(51) Int. Cl.
*G02B 3/08* (2006.01)
*G02B 13/14* (2006.01)

(52) U.S. Cl. .................... 359/743; 359/356

(58) Field of Classification Search .......... 359/742, 359/743, 355, 356
See application file for complete search history.

(56) References Cited

U.S. PATENT DOCUMENTS

| | | | |
|---|---|---|---|
| 2,736,894 A | 2/1956 | Kock | 343/753 |
| 2,931,912 A | 4/1960 | Long, Jr. | 250/209 |
| 2,931,913 A | 5/1960 | Long | 250/237 |
| 3,163,367 A | 12/1964 | Bodian | 362/330 |
| 3,203,306 A | 8/1965 | Lefferts | 359/742 |
| 3,330,951 A | 7/1967 | Neal | 82/157 |
| 3,390,399 A | 6/1968 | Leonard | 359/742 |
| 3,703,718 A | 11/1972 | Berman | 340/258 |
| 3,716,710 A | 2/1973 | Clostermann et al. | 240/106 |
| 3,735,124 A | 5/1973 | Stalhut | 240/106 |
| 3,743,385 A | 7/1973 | Schaefer | 359/742 |
| 3,764,800 A | 10/1973 | Clostermann | 362/330 |
| 3,794,829 A | 2/1974 | Taltavull | 362/330 |
| 3,829,680 A | 8/1974 | Jones | 362/330 |
| 3,839,640 A | 10/1974 | Rossin | 250/353 |
| 3,886,360 A | 5/1975 | Reiss et al. | 250/338 |
| 3,928,843 A | 12/1975 | Sprout et al. | 340/258 |

(Continued)

FOREIGN PATENT DOCUMENTS

JP 10142351 A * 5/1998

OTHER PUBLICATIONS

Photonics Dictionary; http://www.photonics.com/dictHome.aspx; seach term=condenser.*

(Continued)

*Primary Examiner*—Scott J. Sugarman
(74) *Attorney, Agent, or Firm*—John A. Fortkort; Fortkort & Houston P.C.

(57) ABSTRACT

An infrared imaging device is provided which comprises first and second plastic Fresnel lenses that are in optical communication with each other. Each of the first and second lenses have a first major surface which is convex and a second major surface which comprises a Fresnel surface. The first lens is adapted to mimic a meniscus asphere correct for conjugates of infinity and for the focal length of said first lens, and the second lens is adapted to mimic a meniscus asphere and is further adapted to act as a field flattener.

32 Claims, 7 Drawing Sheets

U.S. PATENT DOCUMENTS

| | | | |
|---|---|---|---|
| 3,958,118 A | 5/1976 | Schwarz | 250/221 |
| 3,991,741 A | 11/1976 | Northrup, Jr. et al. | 126/271 |
| 4,080,529 A | 3/1978 | Nagel | 362/235 |
| 4,087,688 A | 5/1978 | Keller | 250/353 |
| 4,115,701 A | 9/1978 | Guichard | 250/353 |
| 4,172,273 A | 10/1979 | Schilling et al. | 362/19 |
| 4,204,881 A | 5/1980 | McGreen | 359/742 |
| 4,210,391 A | 7/1980 | Cohen | 359/743 |
| 4,225,786 A | 9/1980 | Perlman | 250/342 |
| 4,268,752 A | 5/1981 | Herwig et al. | 250/353 |
| 4,271,359 A | 6/1981 | Herwig et al. | 250/347 |
| 4,293,196 A | 10/1981 | Hilbert | 359/743 |
| 4,321,594 A | 3/1982 | Galvin et al. | 359/356 |
| 4,339,748 A | 7/1982 | Guscott et al. | 340/555 |
| 4,340,283 A | 7/1982 | Cohen | 359/743 |
| 4,364,030 A | 12/1982 | Rossin | 340/567 |
| 4,375,034 A | 2/1983 | Guscott | 250/342 |
| 4,379,971 A | 4/1983 | Smith et al. | 250/342 |
| 4,391,495 A | 7/1983 | Mazurkewitz | 359/742 |
| 4,429,224 A | 1/1984 | Wagli et al. | 250/342 |
| 4,442,359 A | 4/1984 | Lederer | 250/342 |
| 4,450,509 A | 5/1984 | Henry | 362/216 |
| 4,523,095 A | 6/1985 | Keller-Steinbach | 250/349 |
| 4,535,240 A | 8/1985 | Vigurs | 359/742 |
| 4,614,938 A | 9/1986 | Weitman | 340/567 |
| 4,617,463 A | 10/1986 | Muirhead | 250/342 |
| 4,644,147 A | 2/1987 | Zublin | 250/221 |
| 4,672,206 A | 6/1987 | Suzuki et al. | 250/342 |
| 4,703,171 A | 10/1987 | Kahl et al. | 350/221 |
| 4,717,821 A | 1/1988 | Messiou | 250/353 |
| 4,757,204 A | 7/1988 | Baldwin et al. | 250/342 |
| 4,769,545 A | 9/1988 | Fraden | 250/353 |
| 4,772,797 A | 9/1988 | Kahl | 250/353 |
| 4,778,996 A | 10/1988 | Baldwin et al. | 250/353 |
| 4,787,722 A | 11/1988 | Claytor et al. | 359/742 |
| 4,841,284 A | 6/1989 | Biersdorff | 340/567 |
| 4,876,445 A | 10/1989 | McMaster | 250/221 |
| 4,896,039 A | 1/1990 | Fraden | 250/342 |
| 4,920,268 A | 4/1990 | Walters et al. | 250/353 |
| 4,930,864 A | 6/1990 | Kuster et al. | 350/167 |
| 5,003,448 A | 3/1991 | Harvath | 362/330 |
| 5,066,855 A * | 11/1991 | Lee | 250/221 |
| 5,103,346 A | 4/1992 | Chang | 359/855 |
| 5,107,120 A | 4/1992 | Tom | 250/342 |
| 5,124,546 A | 6/1992 | Hu | |
| 5,187,360 A | 2/1993 | Pasco | 250/208 |
| 5,381,011 A * | 1/1995 | Sandell et al. | 250/353 |
| 5,442,178 A | 8/1995 | Baldwin | 250/353 |
| 5,537,171 A * | 7/1996 | Ogino et al. | 353/122 |
| 5,567,941 A | 10/1996 | Fujikawa et al. | 250/353 |
| 5,581,402 A | 12/1996 | Taylor | 359/463 |
| 5,603,561 A | 2/1997 | Ohishi | 362/522 |
| RE35,534 E | 6/1997 | Claytor | 359/742 |
| 5,886,821 A | 3/1999 | Sohn | 359/619 |
| 5,929,445 A | 7/1999 | Barone | |
| 6,033,094 A | 3/2000 | Sohn | 362/332 |
| 6,037,594 A | 3/2000 | Claytor et al. | 250/353 |
| 6,239,437 B1 | 5/2001 | Barone | |
| 6,648,477 B2 | 11/2003 | Hutzel et al. | 359/604 |
| 6,690,018 B1 | 2/2004 | Barone | |

OTHER PUBLICATIONS http://www.fresneltech.com, printed Dec. 31, 2003, 10 pages.

\* cited by examiner

IMAGING LENS FOR INFRARED CAMERAS

CROSS-REFERENCE TO RELATED APPLICATIONS

This application claims priority to U.S. Ser. No. 60/416,624, filed Oct. 7, 2002, entitled "Imaging Lens for Infrared Cameras," having the same inventors, and is incorporated herein in its entirety by reference.

FIELD OF THE INVENTION

The present invention relates generally to imaging lenses, and more particularly to imaging lenses suitable for use in infrared thermal imaging applications and devices.

BACKGROUND OF THE INVENTION

Early sensor technology for infrared thermal imaging applications typically used mechanical scanning systems to focus infrared energy onto a single element detector. As a result, the displayed thermal images often had poor resolution, and visible light photographs were often required to identify the object of interest in a thermogram. Early infrared sensors, such as that depicted in U.S. Pat. No. 4,507,551 (Howard et al.), also relied on liquid nitrogen or compressed gas in order to cool the sensor, a requirement which was later eliminated by the introduction of Stirling cycle and thermoelectric coolers.

Many current infrared imagers now use focal plane array (FPA) detectors. These multi-element, solid-state detectors are arrayed together to provide a high-resolution image and to eliminate the need for a mechanical scanning system within the optical path. The introduction of FPA imagers has dramatically improved infrared imaging by providing high-resolution imaging devices with greatly reduced size and weight. Typically, FPA detectors have more than 70,000 elements or pixels. As a result, thermograms taken with an FPA imager often no longer require a corresponding visible light control photograph to help identify objects of interest.

The FPA imaging devices that are currently available may have detectors that are either cooled or uncooled. Cooled FPA imaging devices, which have been commercially available since the early 1990s, operate in the 3–5 µm and 8–14 µm range and generally provide excellent sensitivity. Uncooled FPA imaging devices are a more recent introduction. Unlike previous infrared systems that directly sensed photons, these later systems, which may be adapted to operate in either the 3–5 µm range or the 8–14 µm range, function by sensing changes in electrical resistance across the detector due to temperature changes.

The advent of uncooled FPA detectors for the 3–5 µm and 8–14 µm regions of the infrared has drastically reduced the price, weight, and complexity of infrared imaging devices for these regions. The remaining high-cost and heavy item in these systems is the germanium, zinc selenide, or chalcogenide glass lens, which was formerly used with the expensive and complex cooled detector imaging devices and which is still used with their uncooled replacements. These lenses cannot be made by molding, but instead must typically be diamond turned or ground and polished one at a time. (Chalcogenide glasses can be molded, but the molded blanks typically require postprocessing to be usable.) Moreover, because of their high indices of refraction, it is typically necessary to use antireflection coatings with these lenses, which further adds to their cost and manufacturing complexity. Moreover, even with the very high indices of refraction that germanium and zinc selenide lenses afford, many 3–5 µm and 8–14 µm thermal imaging devices based on these materials still require more than one lens element in order to cover the desired angular field of view with the required image spot size or modulation transfer function (MTF).

In addition to the heavy germanium, zinc selenide and chalcogenide glass lenses noted above which have been typically used in FPA imaging devices, some lighter Fresnel lenses are also currently known to the optical arts, including some which are made out of plastics that transmit in the 8–14 µm region of the infrared. For example, infrared-transmitting plastic Fresnel lenses are currently available commercially from Fresnel Technologies, Inc., Fort Worth, Tex. Some of these lenses are described in commonly assigned Reissued Pat. 35,534 (Claytor). Infrared-transmitting plastic Fresnel lenses are also described in I. Pasco, "Infrared Motion Detection Optics in Plastics: Design, Manufacture, and Application", OSA Proceedings of the International Optical Design Conference, Vol. 22 (G. Forbes Ed, 1994). Those lenses, which are generated from a diamond turned master surface through injection molding or compression molding of high density polyethylene, are designed to operate in the 8–14 µm region of the infrared.

Figure 1:
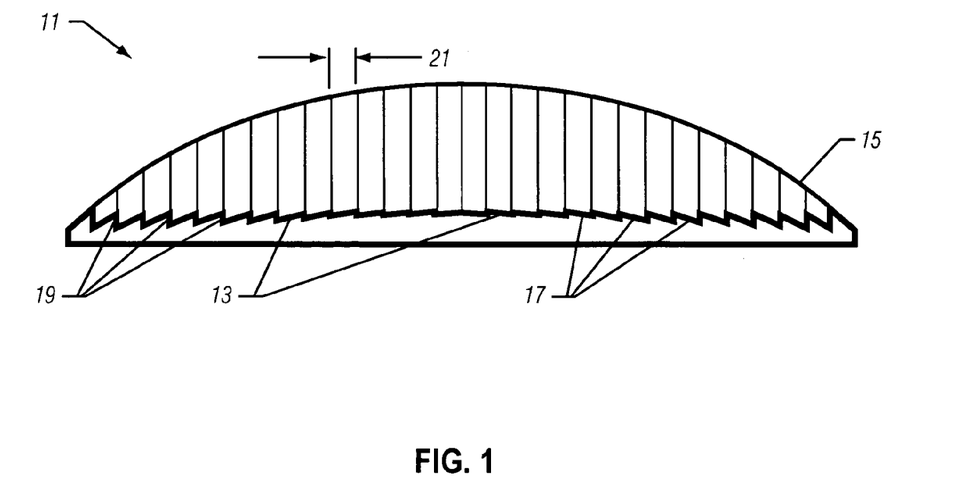
FIG. 1 is an illustration of a prior art Fresnel lens.

Fresnel lenses are advantageous in that they offer a substantial reduction in bulk lens thickness in comparison to regular aspheric lenses. This result can be understood with reference to FIG. 1, which depicts a conventional Fresnel lens 11 that might be used when a reduction is thickness or weight is desired. The Fresnel lens depicted therein comprises a periodic refractive structure of concentric prisms 13. The surfaces of these prisms are designed to refract light by collapsing the aspheric surface 15 of a corresponding conventional lens nearly into a plane. Hence, the reduction in bulk lens thickness is essentially equal to the volume bounded by the original aspheric surface and the new lens surface defined by the surfaces of the prisms. This bulk reduction allows Fresnel lenses to be substantially thinner than their conventional aspheric counterparts.

The refractive surfaces of the prisms making up the Fresnel surface may be referred to as grooves 17 and drafts 19. The grooves are the actual surfaces that are used to approximate the continuous curvature of the aspheric surface of a conventional lens, while the drafts are the necessary discontinuities between the grooves that are required to return the curvature of the lens back to a plane. The lateral distance between the peaks of adjacent grooves is referred to as the pitch 21. The more common type of Fresnel lens for use in the 8–14 µm region of the infrared is described in commonly-assigned patent Re35,534. This lens does not have a constant pitch; instead, the depth of grooves 17 is held constant, so that the groove width (also known as the pitch) varies. The surface of each groove 17 is also individually manufactured to an aspheric contour, rather than the frusto-conical approximation typical of the style of Fresnel lens illustrated in FIG. 1.

While it would be desirable to substitute plastic lenses for the much heavier and more expensive germanium, zinc selenide and chalcogenide glass lenses commonly used in thermal imaging devices, such a substitution is beset by many difficulties. The use of non-Fresnel plastic lenses for this purpose is generally not feasible, due to the poor transmission properties that such lenses have in this region of the spectrum. For example, high density polyethylene, the plastic most commonly used for infrared transmitting lenses in the 8–14 µm region, has poor transmittance characteristics compared to other, more familiar optical materials.

Furthermore, the plastics most commonly used in the 3–5 μm region, polychlorotrifluoroethylene (PCTE) and polytetrafluoroethylene (PTFE), have very low indices of refraction, in addition to poor transmittance at wavelengths longer than 4 μm. While polyethylene has a somewhat higher index of refraction in both the 3–5 μm and the 8–14 μm regions of the infrared, it is still quite low when compared to conventional infrared lens materials such as zinc selenide and germanium. It is therefore not practical to use ordinary lenses based on these plastics for thermal imaging applications, because the large thickness of an ordinary lens with a low f/number (or made from a very low index material) would make the ordinary lens impractically opaque (or at least impractically thick) at its center.

While the use of a plastic Fresnel lens in thermal imaging devices would avoid some of the problems encountered with normal plastic lenses, the use of such a lens is beset by its own difficulties. For example, when typical single element plano-convex plastic Fresnel lenses are incorporated into thermal imaging devices, the image quality of the device suffers markedly. In particular, while image quality is found to be adequate on axis, it is found to deteriorate to the point of uselessness only a degree or so off axis.

In some visible light applications, as in rear projection devices, two Fresnel lens elements (a Fresnel condensor lens and a Fresnel field lens) are used in combination, typically with an LCD panel disposed between them. A description of such a system may be found in A. Davis et al., "P-95: Fresnel Lenses in Rear Projection Display Systems", SID 01 Digest (pp. 1–5). However, it has not generally been considered practical to make infrared imaging devices with multi-element plastic Fresnel lenses, both because the typical loss through each element in this region of the spectrum is relatively large compared to germanium or zinc selenide lenses, and because of the previously noted problems with off-axis performance characteristics. Recent advances in uncooled focal plane arrays have further exacerbated these issues. In particular, the arrays have become larger in size with smaller sensitive areas ("pixels"), thus increasing the angular field of view requirement while decreasing the required spot size.

There is thus a need in the art for a lightweight, inexpensive lens which is suitable for use in thermal imaging applications, and which has acceptable off-axis performance characteristics and image quality. There is also a need in the art for imaging devices that are based on such a lens. These and other needs are met by the devices and methodologies disclosed herein.

SUMMARY OF THE INVENTION

In one aspect, a plastic Fresnel lens, and an infrared imaging device comprising the same, are provided herein, in which the lens comprises first and second plastic Fresnel lens elements that are in optical communication with each other. Each of the first and second lens elements has a first major surface which is convex and a second major surface which comprises a Fresnel surface. The first lens element is preferably adapted to mimic a meniscus asphere correct for conjugates of infinity and the focal length of the first lens element, and the second lens element is preferably adapted to mimic a meniscus asphere and is further adapted to act as a field flattener. Preferably, this field flattener acts to shorten the combined focal length of the first and second lens elements. In contrast to typical prior art imaging devices which utilize field flatteners having a negative focal length, it is preferred that the focal length of the field flattener in the imaging devices disclosed herein is positive. It is further preferred that each of the first and second lens elements has a positive focal length. In the preferred embodiment, each of the first and second lens elements has a first major surface which is convex and a second major surface which comprises a Fresnel surface that comprises a series of grooves. The first and second lens elements are preferably arranged within a housing such that they are in optical communication with each other and such that the first major surface of each lens element faces the scene to be imaged. Preferably, the first and second lens elements are coaxially aligned along the imaging path of an imaging device.

In another aspect, a lens, and an infrared imaging device comprising the same, are provided herein, in which the lens comprises first and second plastic Fresnel lens elements that are in optical communication with each other, and wherein the first lens element has positive power and the second lens element also has positive power.

In still another aspect, a lens comprising first and second lens elements, and an infrared imaging device comprising the same, are provided herein. The first and second lens elements have individual focal lengths $f_1$ and $f_2$, respectively, and have a combined focal length $f_{12}$ such that $f_{12} < f_1 + f_2$, and preferably, such that $f_{12} < f_2 < f_1 < f_1 + f_2$.

In yet another aspect, an infrared imaging device is provided herein comprising a housing having an aperture therein, and having first and second plastic lens elements disposed within the housing. Each of the first and second lens elements has a first major surface which is convex and a second major surface which comprises a Fresnel surface that comprises a series of grooves, and each of the grooves is preferably aspherical in a cross-section taken along at least one plane that is perpendicular to the length of the groove. The first and second lens elements are arranged within the housing such that they are in optical communication with each other and such that the first major surface of each lens element faces the aperture.

In still another aspect, the present invention relates to an IR imaging device with a multi-element lens having at least two plastic lens elements, wherein the at least two lens elements provide at least four non-plano optical surfaces disposed in the imaging path of the device. The four non-plano optical surfaces allow significantly more flexibility in tailoring the off-axis performance of the device as compared, for example, to an imaging device which utilizes a single plano-convex lens. This is especially true in applications where the focal plane is required to be flat. This would be the case, for example, when the infrared imaging device is used in combination with an infrared focal plane array detector, as these detectors are universally flat. In particular, in devices utilizing a single plano-convex lens, the surface over which the image comes into focus as a point source is moved off-axis is curved. Hence, while such a lens may be useful in imaging devices having a curved focal plane, it is not useful in devices requiring a relatively flat focal plane. By contrast, in an imaging device constructed with at least four non-plano optical surfaces, the additional surfaces can be used to appropriately flatten the focal plane.

These and other aspects are described in greater detail below.

DETAILED DESCRIPTION

A. Definitions

As used herein, the term "field flattener" refers to a lens, lens element, or optical surface placed in an optical system which has the effect of reducing curvature of optical system's focal surface.

As used herein, the term "orientation", when used in reference to two or more lens elements, refers to the relative disposition of the optical axes of the lens elements with respect to each other. Hence, if the orientation of two such lens elements is said to be fixed, this means that the optical axes of the of the two lens elements remains essentially parallel or that the angle of intersection of the two optical axes remains essentially constant, notwithstanding any possible change in the distance between the two elements.

B. Overview

It has now been surprisingly found that, through proper design, a lightweight, inexpensive plastic Fresnel lens can be made that is suitable for use in thermal imaging applications. These lenses, which afford a large angular field of view and a reasonable decrease in spot size, can be used in many applications to replace the heavy and expensive zinc selenide and germanium lenses currently employed in 3–5 μm and 8–14 μm thermal imaging devices.

The lenses disclosed herein preferably comprise at least first and second lens elements which are designed and arranged such that each of the first and second lens elements are convex toward the object side and concave on the image side in their overall shape. Each lens element also preferably has a Fresnel surface on its concave surface, and the grooves of the Fresnel surface are preferably concentric. The grooves on the first lens element are preferably convex in a cross-section taken along a plane perpendicular to the length of the groove. The grooves of the second lens element near the optical axis are preferably slightly concave in a cross-section taken along a plane perpendicular to the length of the groove, while the grooves near the periphery of the second lens element are essentially flat.

C. Specific Embodiments

Figure 2:
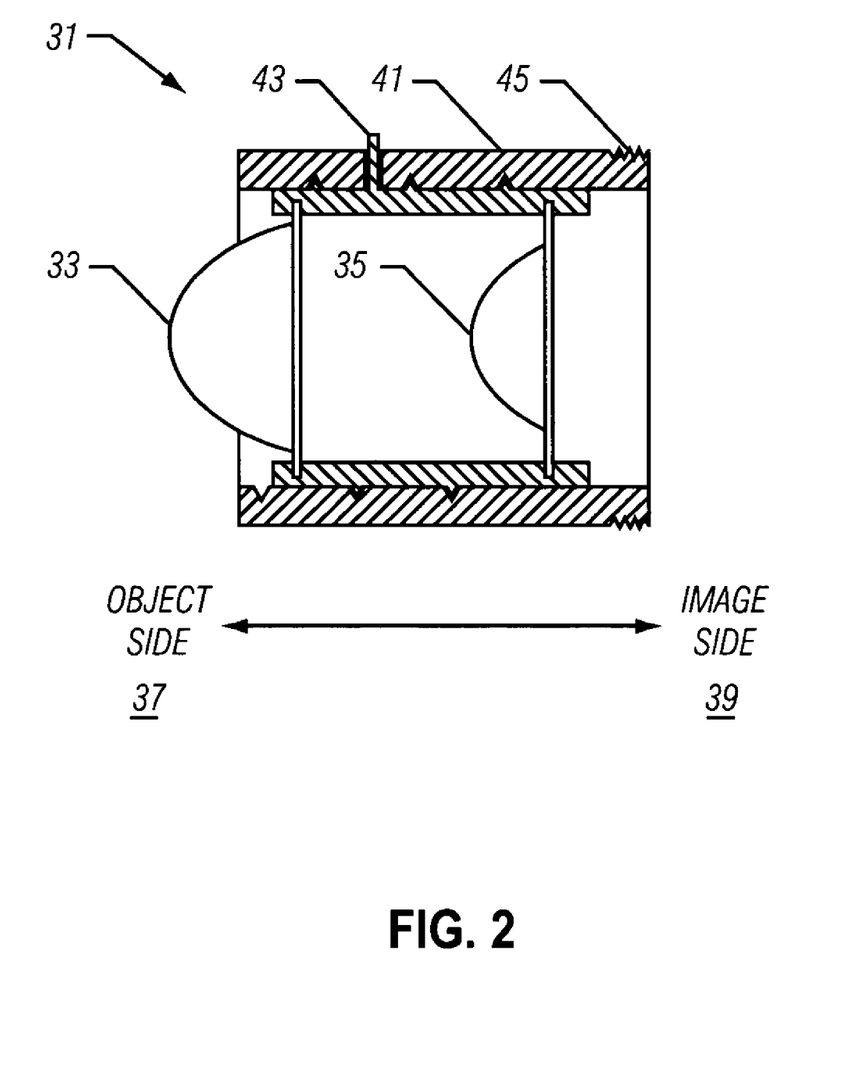
FIG. 2 is an illustration of a lens in accordance with the teachings herein.
Figure 3:
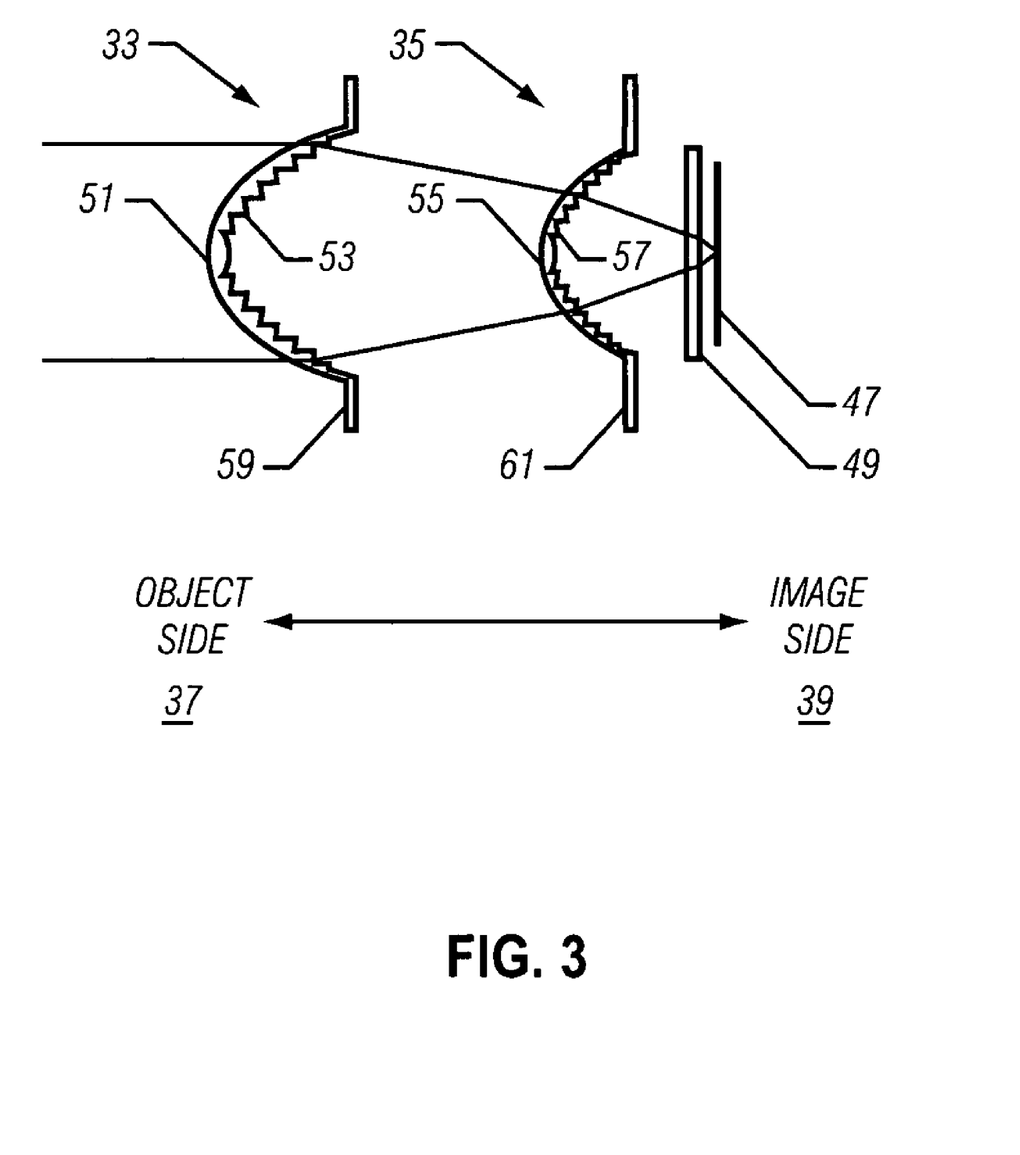
FIG. 3 is an illustration depicting some of the components of the lens of FIG. 2 in greater detail.

The lenses and thermal imaging devices made in accordance with the teachings herein may be further understood with reference to the specific embodiments set forth in FIGS. 2 and 3. Of course, one skilled in the art will appreciate that several variations in these lenses and devices are possible without departing from the scope of the present disclosure. Hence, these embodiments are provided for illustrative purposes only, and are not intended to be limiting.

Referring to FIG. 2, a thermal imaging device 31 is provided in accordance with the teachings herein which includes a first lens element 33 and a second lens element 35. The first lens element is disposed closer to the object side 37 of the device, and the second lens element is disposed closer to the image side 39 of the device. The device is provided with a housing 41 equipped with a means 43 for moving the two lens elements simultaneously nearer to, and further from, the image plane. The housing is also equipped with one or more elements 45 adapted to attach the lens to an infrared camera body.

FIG. 3 shows the two lens elements 33 and 35 of FIG. 2 in more detail, and further illustrates the relative placement of the focal plane array 47 and its (typically germanium) window 49. Rays coming from an object a long distance away are seen refracted first by the continuous aspherical surface 51 of the first lens element, then by the Fresnel surface 53 of the first lens element, then by the continuous aspherical surface 55 of the second lens element, and finally by the Fresnel surface 57 of the second lens element. The rays are then seen passing through the germanium window and coming to focus on the focal plane array.

Flanges 59 and 61 are provided on the periphery of each lens element so that the lens elements can be mounted in the chassis of a camera or other imaging device or structure. Of course, one skilled in the art will appreciate that flanges are only one particular means by which the lens elements may be mounted to a substrate or chassis, and that various other means may be used for this purpose without departing from the scope of the teachings herein. Thus, for example, the lens elements could be secured to a substrate or chassis through the use of a suitable adhesive, or by disposing the lens elements in a frame equipped with a threaded surface that is adapted to mate with a similar surface provided on the substrate or chassis.

In a device such as that depicted in FIGS. 2 and 3, the first lens element (that is, the lens element closer to the object) mimics a meniscus asphere which is correct for conjugates of infinity and its focal length. The focal length of this lens element is longer than the combined focal length of both elements. The second lens element also mimics a meniscus asphere, and acts as a "field flattener". However, this field flattener differs from those found in many other imaging devices in that it has positive, rather than negative, power. The positive power of the second lens element produces a shorter overall focal length for the system than is the case for the first lens element taken alone. This reduction in focal length improves the speed of the lens (that is, it lowers the f/number of the lens), a feature which compensates somewhat for the use of a material (such as polyethylene) in the construction of the lens elements, which material has a lower refractive index and a higher absorption loss than germanium or zinc selenide.

The first and second lens elements are adjustably disposed within the housing such that their position relative to the aperture (and therefore the object and image sides) may be conveniently and simultaneously manipulated with a suitable focusing mechanism. Such focusing elements, which may be gear-driven, are well known to the art.

D. EXAMPLES

The following examples are provided for illustrative purposes only to demonstrate some of the features and aspects of the lenses and imaging devices made in accordance with the teachings herein. Hence, these examples are not intended to be limiting.

Example 1

This example illustrates the design of one particular 25 mm lens made in accordance with the teachings herein.

A 25 mm lens having the general attributes of the device depicted in FIGS. 2–3 was designed for use in the 8 to 14 μm range. As explained in greater detail below, the design was optimized using ZEMAX® optical design software EE Edition (available commercially from Focus Software, Inc., Tucson, Ariz.).

Figure 4:
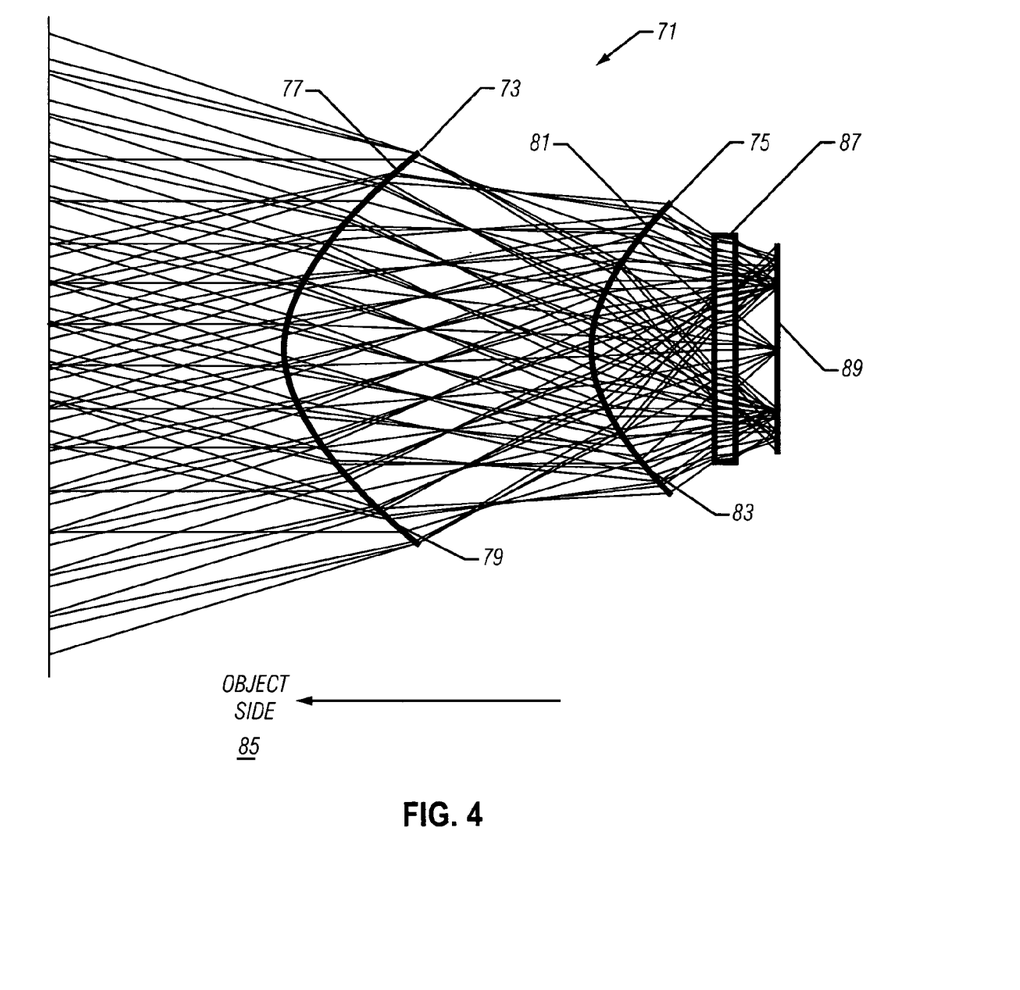
FIG. 4 is an illustration, including a ray tracing, of a first lens made in accordance with the teachings herein which has a 25 mm combined focal length and covers a field of view of approximately ±14 degrees.

As seen in FIG. 4, the lens 71 of this example consists of first 73 and second 75 plastic Fresnel lens elements which are arranged in optical communication with each other and are coaxially aligned along the image path. The first lens element has a first major surface 77 which is convex, and a second major surface 79 which comprises a Fresnel surface. Similarly, the second lens element has a first major surface 81 which is convex, and a second major surface 83 which comprises a Fresnel surface. The Fresnel surfaces of the first and second lens elements are designed in the continuous style of the software such that the average thickness of each lens element is maintained at a constant 0.5 mm across the aperture when measured normal to the first surface of the lens element. That is, the grooves are not treated individually, but are considered to be of zero thickness, and therefore infinitely narrow. A germanium window 87 and a focal plane array 89 are disposed on the side of the device opposite the object side 85.

The lens of this example had a focal length of 25 mm when used in conjunction with a germanium window having a typical thickness of 1.5 mm and when the spacing between the proximate surface of the flange 61 of the second lens and the focal plane array is a typical 4.3 mm, and was designed to cover an approximately 28° field of view (±14 degrees). A typical FPA has an area approximately 9×12 mm. It is desirable that the optics achieve a spot size comparable to the size of a pixel in the FPA. It is also preferred that the object distance should range from infinity to approximately 0.5 m. Hence, these parameters were included in the lens design and optimization.

FIG. 4 also includes a ray tracing which illustrates the optical characteristics of the lens design. In particular, the ray tracing illustrates the optical effect of the various elements of the lens on specific bundles of rays taken at both on-axis and off-axis points.

As seen from the ray tracing, the lens exhibits substantially less field curvature than would be the case with a single element plano-convex lens. The ray tracing also illustrates the field-flattening effect (reduction in the curvature of the field) of the second lens element, which mimics a meniscus asphere. This field flattening effect is evident as a convergence of the focal surface from an aspherical locus disposed past the FPA to essentially a planar locus at the surface of the FPA. The field flattening effect of the lens thus makes the lens compatible with FPAs, which typically require the focal plane to be planar.

As noted above, the design of the lens of this example was optimized using ZEMAX® optical design software. The general lens parameters used for the optimization are set forth in TABLE 1A:

TABLE 1A

General Lens Data

| | |
|---|---|
| Surfaces | 9 |
| Stop | 4 |

TABLE 1A-continued

General Lens Data

| | |
|---|---|
| System Aperture | Entrance Pupil Diameter = 31.25 |
| Glass Catalogs | Schott IR Material Infrared |
| Ray Aiming | Off |
| Apodization | Uniform, factor = 0.00000E+000 |
| Effective Focal Length (in air) | 25.0787 |
| Effective Focal Length (in image space) | 25.0787 |
| Back Focal Length | 3.25687 |
| Total Track | 61.73985 |
| Image Space F/# | 0.8025183 |
| Paraxial Working F/# | 0.738233 |
| Working F/# | 0.739319 |
| Image Space NA | 0.5607764 |
| Object Space NA | 1.5625e−009 |
| Stop Radius | 10.47365 |
| Paraxial Image Height | 6.608069 |
| Paraxial Magnification | 0 |
| Entrance Pupil Diameter | 31.25 |
| Entrance Pupil Position | 34.06097 |
| Exit Pupil Diameter | 64.90003 |
| Exit Pupil Position | −52.37659 |
| Field Type | Angle in degrees |
| Maximum Field | 17 |
| Primary Wave | 8 |
| Lens Units | Millimeters |
| Angular Magnification | 0.4107146 |

The significance of the various parameters set forth in TABLE 1A (some of which are also discussed below) is described in the instruction manual accompanying the software, which manual is entitled ZEMAX® Software For Optical Design (2002) and is available for download at http://www.focus-software.com/zemax/index.html. Further information about ZEMAX® optical design software, including information concerning the features of the software and the design optimization parameters that can be specified by the user, and instructions on using the software, can be found at http://www.optima-research.com/Software/Optical/Zemax/index.htm.

The lens design was optimized using 9 optical surfaces (two each on the two lens elements and the germanium window, and one each for the air interfaces between the first and second lens elements, the first lens element and the image source, and the second lens element and the germanium window). The listing "Schott IR Material Infrared" for the glass catalogs parameter refers to the material specified for the lens elements. That material is a custom-made polyethylene with a refractive index of 1.54 which exhibits essentially no dispersion over the 8–14 μm region, and whose refractive index over this region is almost the same as the refractive index of the material over the visible region of the spectrum.

The lens surface data details specified for the optimization are set forth in TABLE 1B:

TABLE 1B

Lens Surface Data Summary

| SURF | Type | Radius | Thickness | Glass | Diameter | Conic |
|---|---|---|---|---|---|---|
| OBJ | STANDARD | Infinity | Infinity | — | 0 | 0 |
| 1 | STANDARD | Infinity | 20 | — | 52.07697 | 0 |
| 2 | STANDARD | 11.71136 | 0.381 | POLYIR2 | 32.81849 | −1 |
| 3 | XFRESNEL | 11.71136 | 11 | — | 32.81849 | −1 |
| STO | STANDARD | Infinity | 14.79078 | — | 32.97085 | 0 |
| 5 | STANDARD | 11.33928 | 0.381 | POLYIR2 | 24.33582 | −1 |
| 6 | XFRESNEL | 11.33928 | 10.13707 | — | 24.33582 | −1 |
| 7 | STANDARD | Infinity | 1.5 | GERMANIUM | 18.95219 | 0 |
| 8 | STANDARD | Infinity | 3.55 | — | 18.51963 | 0 |
| IMA | STANDARD | Infinity | — | — | 17.98061 | 0 |

The surface data details specified for optimization are set forth in TABLE 1C. The following even aspheric polynomial was used to model the lens surfaces for purposes of optimization:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16} \quad \text{(EQUATION 1)}$$

wherein z is the "sag" or z-coordinate of the aspherical surface, c is the curvature (the reciprocal of the radius) of the surface, r is the radial coordinate in lens units, k is the conic constant, and $\alpha_1, \alpha_2, \alpha_3, \alpha_4, \alpha_5, \alpha_6, \alpha_7$, and $\alpha_8$ are the polynomial coefficients. The polynomial coefficients are referred to in TABLE 1C for surfaces 3 and 6, which surfaces correspond to Fresnel surfaces 83 and 79, respectively, of FIG. 4.

The two surfaces obtained from the ZEMAX® optical design software for each lens element consisted of a continuous first surface and an extended Fresnel second surface. The continuous first surface was an even aspheric surface with a conic constant of −1 and no higher order terms, i.e., a parabolic surface. In general, this surface could be described by an $n^{th}$ order even aspheric function. The extended Fresnel surface consisted of a parabolic surface upon which the Fresnel surface is impressed. The refraction at this surface depends on both the Fresnel power and the substrate power.

TABLE 1C

Surface Data Detail

| | |
|---|---|
| Surface OBJ | STANDARD |
| Surface 1 | STANDARD |
| Surface 2 | STANDARD |
| Surface 3 | XFRESNEL |
| Coeff on r 2 | 0 |
| Coeff on r 4 | 0 |
| Coeff on r 6 | 0 |
| Coeff on r 8 | 0 |
| Coeff on r 10 | 0 |
| Coeff on r 12 | 0 |
| Coeff on r 14 | 0 |
| Coeff on r 16 | 0 |
| Maximum Term | 5 |
| Curvature | 0.03850648 |
| Conic | −1 |
| Term on r to 2 | −0.034335472 |
| Term on r to 4 | −1.9658461e−005 |

TABLE 1C-continued

Surface Data Detail

| | |
|---|---|
| Term on r to 6 | 9.5215869e−009 |
| Term on r to 8 | −2.3250699e−011 |
| Term on r to 10 | 0 |
| Surface STO | STANDARD |
| Surface 5 | STANDARD #2 |
| Surface 6 | XFRESNEL |
| Coefficient on r 2 | 0 |
| Coefficient on r 4 | 0 |
| Coefficient on r 6 | 0 |
| Coefficient on r 8 | 0 |
| Coefficient on r 10 | 0 |
| Coefficient on r 12 | 0 |
| Coefficient on r 14 | 0 |
| Coefficient on r 16 | 0 |
| Maximum Term | 5 |
| Curvature | 0.69226673 |
| Conic | −1 |
| Term on r to 2 | −0.3844773 |
| Term on r to 4 | −5.7987908e−005 |
| Term on r to 6 | 1.3399916e−007 |
| Term on r to 8 | 4.8243959e−011 |
| Term on r to 10 | 0 |
| Surface 7 | STANDARD |
| Surface 8 | STANDARD |
| Surface IMA | STANDARD |

The indices of refraction and coefficients of thermal expansion specified for the lens elements, the germanium window, and the air interfaces are set forth in TABLES 1D and 1E:

TABLE 1D

Index of refraction Data

| Surface | Glass | Temperature | Pressure | Refractive Index at 8.0 μms |
|---|---|---|---|---|
| 0 | — | 20.00 | 1.00 | 1.00000000 |
| 1 | — | 20.00 | 1.00 | 1.00000000 |
| 2 | POLYIR2 | 20.00 | 1.00 | 1.54000000 |
| 3 | — | 20.00 | 1.00 | 1.00000000 |
| 4 | — | 20.00 | 1.00 | 1.00000000 |
| 5 | POLYIR2 | 20.00 | 1.00 | 1.54000000 |
| 6 | — | 20.00 | 1.00 | 1.00000000 |
| 7 | GERMANIUM | 20.00 | 1.00 | 4.00532048 |
| 8 | — | 20.00 | 1.00 | 1.00000000 |
| 9 | — | 20.00 | 1.00 | 1.00000000 |

TABLE 1E

Thermal Coefficient of Expansion Data

| Surface | Glass | TEC * 10E−6 |
|---|---|---|
| 0 | — | 0.00000000 |
| 1 | — | 0.00000000 |
| 2 | POLYIR2 | 0.00000000 |
| 3 | — | 0.00000000 |
| 4 | — | 0.00000000 |
| 5 | POLYIR2 | 0.00000000 |
| 6 | — | 0.00000000 |
| 7 | GERMANIUM | 5.70000000 |
| 8 | — | 0.00000000 |
| 9 | — | 0.00000000 |

Figure 5:
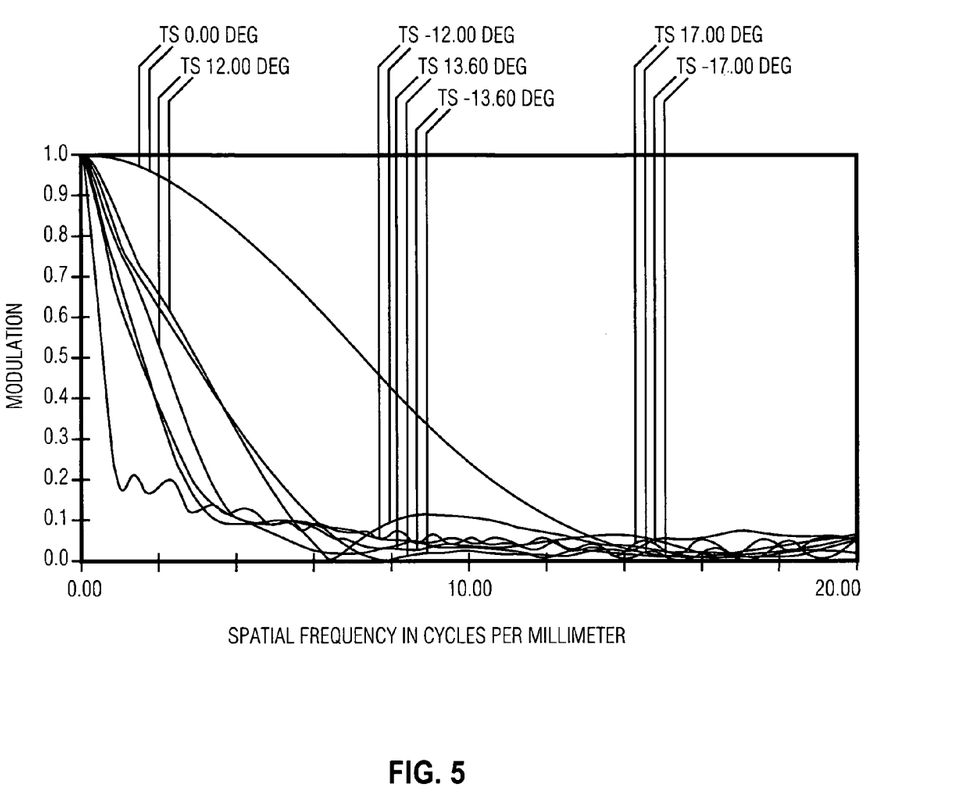
FIG. 5 is a graph of the calculated modulation transfer function for the lens of FIG. 4.

FIG. 5 is a graph of the Modulation Transfer Function (MTF) as a function of spatial frequency for the lens of FIG. 4, as calculated at the seven different field angles set forth in TABLE 1F:

TABLE 1F

Field Angles for MTF

| Field No. | X-Value | Y-Value | Z-Value |
|---|---|---|---|
| 1 | 0.000000 | 0.000000 | 1.000000 |
| 2 | 0.000000 | 12.000000 | 1.000000 |
| 3 | 0.000000 | −12.000000 | 1.000000 |
| 4 | 0.000000 | 13.600000 | 1.000000 |
| 5 | 0.000000 | −13.600000 | 1.000000 |
| 6 | 0.000000 | 17.000000 | 1.000000 |
| 7 | 0.000000 | −17.000000 | 1.000000 |

The MTF is defined as the modulation, $M_I$, of the image produced by the lens divided by the modulation of the stimulus (the object), $M_o$, as shown in EQUATION 2:

$$MTF(v) = M_I/M_o \quad \text{(EQUATION 2)}$$

Modulation $M_n$ is itself defined by EQUATION 3:

$$M_n = (L_{max} - L_{min})/(L_{max} + L_{min}) \quad \text{(EQUATION 3)}$$

where $L_{max}$ is the maximum luminance of the device and $L_{min}$ is the minimum luminance of the device. The MTF is a measurement of the lens' ability to transfer contrast from an object to the intermediate image plane at a specific resolution. It thus incorporates resolution and contrast data into a single function, and provides a general measurement of image degradation caused by optical imperfections in the lens. Typically, at modulations below about 0.40, the resolution of the system becomes sufficiently poor that it becomes difficult to resolve black and white.

As seen from FIG. 5, an imaging device utilizing the lens of FIG. 4 is predicted to have adequate resolution up to about 8 cycles/mm at 0°, and substantially higher resolutions at lower spatial frequencies. As would be expected, the resolution off-axis is somewhat poorer for the system, but is sufficiently good to distinguish black and white at frequencies as high as 4 cycles/mm for angles of about 12° to about 13.6°. At 17°, the field angle corresponding to the edge of the focal plane array when used with a 25 mm focal length lens, resolution is sufficient at spatial frequencies of up to about 1 cycle/mm.

The above noted results demonstrate the feasibility of an imaging device having a focal length of 25 mm and made from multiple plastic lens elements, when the design utilizes multiple aspherical optical surfaces (including two Fresnel surfaces) to flatten the image field.

Example 2

This example illustrates the design of one particular 50 mm lens made in accordance with the teachings herein.

Figure 6:
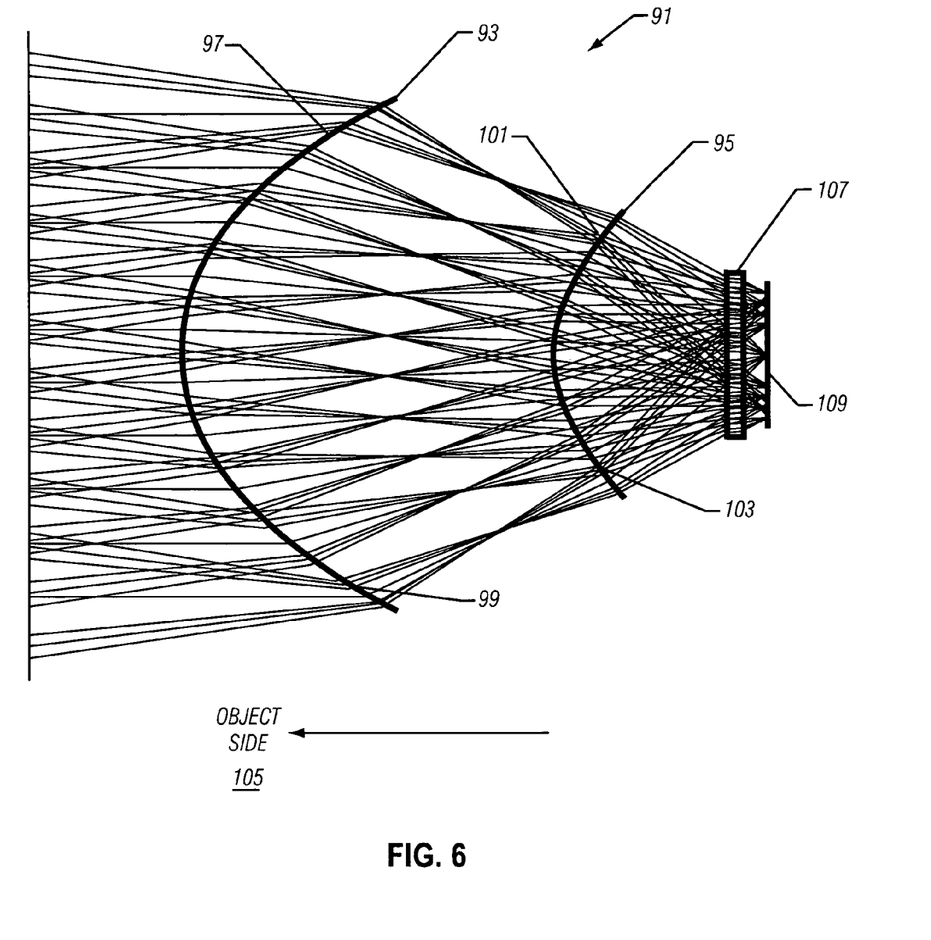
FIG. 6 is an illustration, including a ray tracing, of a second lens made in accordance with the teachings herein which has a 50 mm combined focal length and covers a field of view of approximately ±6.5 degrees.

Following the same general procedure of EXAMPLE 1, a lens having the general attributes of the device depicted in FIGS. 2–3 was designed for use in the 8 to 14 μm range. As seen in FIG. 6, the lens 91 of this example consists of first 93 and second 95 plastic Fresnel lens elements which are arranged in optical communication with each other and are coaxially aligned along the image path. The first lens element has a first major surface 97 which is convex, and a second major surface 99 which comprises a Fresnel surface. Similarly, the second lens element has a first major surface 101 which is convex, and a second major surface 103 which comprises a Fresnel surface. The Fresnel surfaces of the first and second lens elements are designed in the continuous style of the software such that the average thickness of each lens element is maintained at a constant 0.5 mm across the aperture when measured normal to the first surface of the lens element (that is, the grooves are not treated individually, but are considered to be of zero thickness and therefore infinitely narrow). A germanium window 107 and a focal plane array 109 are disposed on the side of the device opposite the object side 105.

The lens, which is depicted in FIG. 6, has a combined focal length of 50 mm when used in conjunction with a germanium window having a typical thickness of 1.5 mm and when the spacing between the proximate surface of the flange 61 of the second lens and the focal plane array is a typical 4.3 mm, and was designed to cover an approximately 13° field of view (±6.5 degrees). A typical FPA has an area approximately 9×12 mm. It is desirable that the optics achieve a spot size comparable to the size of a pixel in the FPA. It is also preferred that the object distance should range from infinity to approximately 1.0 m. Accordingly, these parameters were assumed in the design and optimization of the lens.

FIG. 6 includes a ray tracing of the lens. As with the lens of FIG. 4, the second lens element in FIG. 6 is seen to act as a field flattener which reduces the curvature of the field such that the ray bundles are seen to come into focus at the surface of the detector. However, the field flattening effect of the second lens element is more dramatic (that is, the reduction in field curvature is greater) in the lens of FIG. 6 than in the lens of FIG. 4.

As with the design of EXAMPLE 1, the design of this example was optimized with the aid of ZEMAX® optical design software. The general lens parameters specified for the optimization are set forth in TABLE 2A.

TABLE 2A

General Lens Data

| | |
|---|---|
| Surfaces | 9 |
| Stop | 4 |
| System Aperture | Entrance Pupil Diameter = 62.5 |
| Glass Catalogs | Schott IR Material Infrared |
| Ray Aiming | Off |
| Apodization | Uniform, factor = 0.00000E+000 |
| Effective Focal Length (in air) | 50.02554 |
| Effective Focal Length (in image space) | 50.02554 |
| Back Focal Length | 3.386807 |
| Total Track | 96.60431 |
| Image Space F/# | 0.8004087 |
| Paraxial Working F/# | 0.7147559 |
| Working F/# | 0.7869535 |

TABLE 2A-continued

General Lens Data

| | |
|---|---|
| Image Space NA | 0.5732091 |
| Object Space NA | 3.125e-009 |
| Stop Radius | 18.38195 |
| Paraxial Image Height | 5.984293 |
| Paraxial Magnification | 0 |
| Entrance Pupil Diameter | 62.5 |
| Entrance Pupil Position | 54.3608 |
| Exit Pupil Diameter | 82.60084 |
| Exit Pupil Position | −66.27763 |
| Field Type | Angle in degrees |
| Maximum Field | 8.7 |
| Primary Wave | 8 |
| Lens Units | Millimeters |
| Angular Magnification | 0.7707784 |

The lens surface data details specified for the optimization are set forth in TABLE 2B:

TABLE 2B

Lens Surface Data Summary

| SURF | Type | Radius | Thickness | Glass | Diameter | Conic |
|---|---|---|---|---|---|---|
| OBJ | STANDARD | Infinity | Infinity | — | 0 | 0 |
| 1 | STANDARD | Infinity | 20 | — | 79.13674 | 0 |
| 2 | EVENASPH | 21.41445 | 0.381 | POLYIR2 | 64.94605 | −1 |
| 3 | XFRESNEL | 21.03345 | 25.5 | — | 64.94605 | −1 |
| STO | STANDARD | Infinity | 22.33706 | — | 64.94605 | 0 |
| 5 | EVENASPH | 6.660743 | 0.381 | POLYIR2 | 35.64393 | −1 |
| 6 | XFRESNEL | 6.660743 | 22.95525 | — | 35.39562 | −1 |
| 7 | STANDARD | Infinity | 1.5 | GERMANIUM | 19.178 | 0 |
| 8 | STANDARD | Infinity | 3.55 | — | 18.81432 | 0 |
| IMA | STANDARD | Infinity | — | — | 17.51002 | 0 |

As in EXAMPLE 1, the two surfaces obtained from the ZEMAX® optical design software for each lens element consisted of a continuous first surface and an extended Fresnel second surface. The continuous first surface was an even aspheric surface with a conic constant of −1 and no higher order terms, i.e., a parabolic surface. In general, this surface could be described by an $n^{th}$ order even aspheric function. The extended Fresnel surface consisted of a parabolic surface upon which the Fresnel surface is impressed. The refraction at this surface depends on both the Fresnel power and the substrate power. The surface data details specified for optimization are set forth in TABLE 2C:

TABLE 2C

Surface Data Detail

| | |
|---|---|
| Surface OBJ | STANDARD |
| Surface 1 | STANDARD |
| Surface 2 | EVENASPH #1 |
| Coefficient on r 2 | −0.00050960617 |
| Coefficient on r 4 | −5.9913872e−006 |
| Coefficient on r 6 | 1.0039256e−008 |
| Coefficient on r 8 | −2.2846934e−012 |
| Coefficient on r 10 | 0 |
| Coefficient on r 12 | 0 |
| Coefficient on r 14 | 0 |
| Coefficient on r 16 | 0 |
| Surface 3 | XFRESNEL |
| Coefficient on r 2 | −0.00050960617 |
| Coefficient on r 4 | −5.9913872e−006 |
| Coefficient on r 6 | 1.0039256e−008 |
| Coefficient on r 8 | −2.2846934e−012 |
| Coefficient on r 10 | 0 |
| Coefficient on r 12 | 0 |
| Coefficient on r 14 | 0 |
| Coefficient on r 16 | 0 |
| Maximum Term | 5 |
| Curvature | 0.053458761 |
| Conic | −1 |
| Term on r to 2 | −0.035844772 |
| Term on r to 4 | −3.979857e−006 |
| Term on r to 6 | 1.5998158e−009 |
| Term on r to 8 | −2.5501942e−012 |
| Term on r to 10 | 0 |
| Surface STO | STANDARD |
| Surface 5 | EVENASPH #2 |
| Coefficient on r 2 | −0.047732298 |
| Coefficient on r 4 | 3.5062143e−006 |
| Coefficient on r 6 | 2.5327851e−008 |
| Coefficient on r 8 | −1.5246349e−010 |
| Coefficient on r 10 | 0 |
| Coefficient on r 12 | 0 |
| Coefficient on r 14 | 0 |
| Coefficient on r 16 | 0 |
| Surface 6 | XFRESNEL |
| Coefficient on r 2 | −0.047732298 |
| Coefficient on r 4 | 3.5062143e−006 |
| Coefficient on r 6 | 2.5327851e−008 |
| Coefficient on r 8 | 1.5246349e−010 |
| Coefficient on r 10 | 0 |
| Coefficient on r 12 | 0 |
| Coefficient on r 14 | 0 |
| Coefficient on r 16 | 0 |
| Maximum Term | 5 |
| Curvature | 0.71684548 |
| Conic | −1 |
| Term on r to 2 | −0.37632021 |
| Term on r to 4 | −2.8569422e−006 |
| Term on r to 6 | −4.2962628e−008 |
| Term on r to 8 | 1.5819444e−010 |
| Term on r to 10 | 0 |
| Surface 7 | STANDARD |
| Surface 8 | STANDARD |
| Surface IMA | STANDARD |

The indices of refraction and coefficients of thermal expansion specified for the lens elements, the germanium window, and the air interfaces are identical to those set forth in TABLES 1D and 1E.

Figure 7:
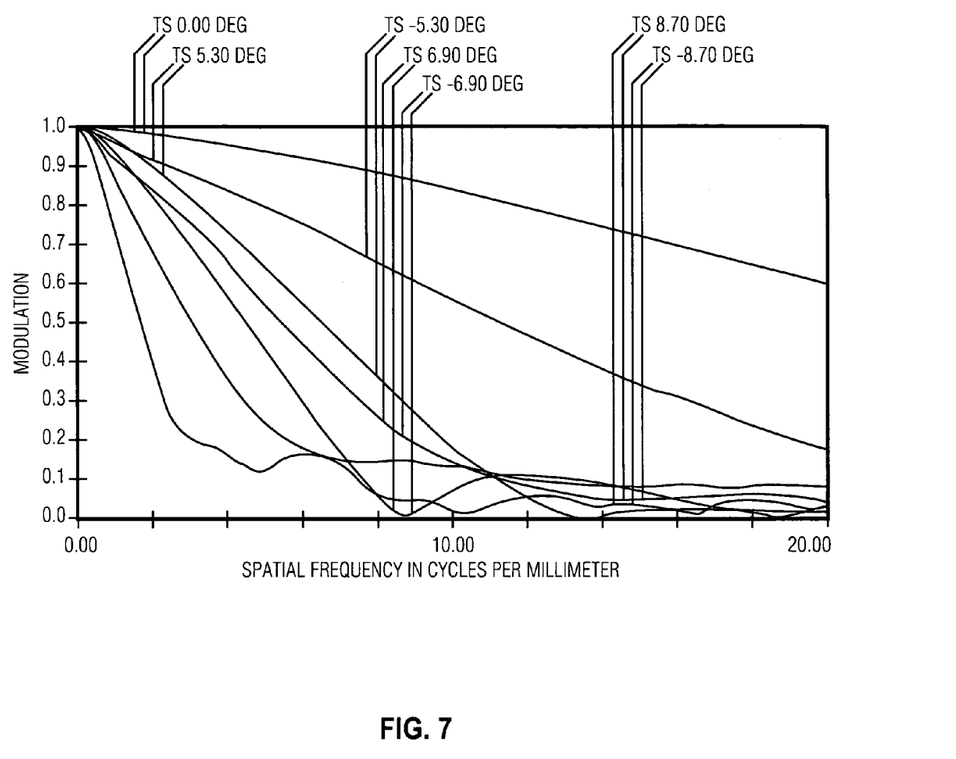
FIG. 7 is a graph of the calculated modulation transfer function for the lens of FIG. 6.

FIG. 7 is a graph of the Modulation Transfer Function (MTF) as a function of spatial frequency for the lens of FIG. 6, and calculated at the seven different field angles set forth in TABLE 2D.

TABLE 2D

| | Field Angles | | |
|---|---|---|---|
| Field No. | X-Value | Y-Value | Z-Value |
| 1 | 0.000000 | 0.000000 | 1.000000 |
| 2 | 0.000000 | 5.300000 | 1.000000 |
| 3 | 0.000000 | −5.300000 | 1.000000 |
| 4 | 0.000000 | 6.900000 | 1.000000 |
| 5 | 0.000000 | −6.900000 | 1.000000 |
| 6 | 0.000000 | 8.700000 | 1.000000 |
| 7 | 0.000000 | −8.700000 | 1.000000 |

By comparing FIG. 7 to FIG. 5, it can be seen that the lens of FIG. 6 has a more pronounced telephoto effect than the lens of FIG. 4, as shown by the narrower field and higher resolution. Thus, for example, at a field angle of 0°, an imaging device utilizing the lens of FIG. 6 has adequate resolution over all of the spatial frequencies investigated. At 8.7°, the field angle corresponding to the edge of the focal plane array when used with a 50 mm lens, resolution is sufficient at spatial frequencies of up to about 2 cycle/mm.

The above noted results demonstrate the feasibility of an imaging device having a focal length of 50 mm and made from multiple plastic lens elements, when the design utilizes multiple aspherical optical surfaces (including two Fresnel surfaces) to flatten the image field.

E. Other Software

EXAMPLES 1 and 2 have demonstrated a particular approach for optimizing the design of plastic Fresnel lenses made in accordance with the teachings herein through the use of ZEMAX® optical design software. Of course, one skilled in the art will appreciate that various other methods, approaches and software programs may be used for the design and/or optimization of the lenses described herein. Such other software programs include, for example, CODE V® optical design software, available commercially from Optical Research Associates, Inc., Pasadena, Calif. Accordingly, the description in the preceding examples of the particular approach and software used to design and optimize the lenses described in those examples is not meant to limit lenses made in accordance with the teachings herein to lenses designed or optimized using the approach described in the examples or to lenses designed or optimized through the use of ZEMAX® optical design software.

The continuous Fresnel surface produced by the calculations performed with the ZEMAX® optical design software in EXAMPLES 1 and 2 contains no information on individual grooves of the Fresnel surface, but only on the overall curvature of the Fresnel surface. As noted above, this surface is described by the standard rotationally symmetric aspheric equation, i.e., a conic section plus higher order (but only even order polynomial) correction terms. Software exists to optimize the design and model the optical effect of the shapes of the individual grooves on the Fresnel surface. An example of software suitable for these purposes is DIFFSYS® diffractive and aspheric lens generation software, which is commercially available from Western Isle Software, North Wales, Great Britain. One skilled in the art will thus appreciate that it is possible to use combinations of software to design or optimize lenses in accordance with the teachings herein. In particular, for example, a first software program, such as the ZEMAX® optical design software noted above, may be employed to design and/or optimize the overall features of the lens, while a second software program, such as DIFFSYS® diffractive and aspheric lens generation software, may be employed to further optimize particular features of the lens, such as the shape of the individual grooves on the Fresnel surfaces of the lens.

F. Materials

The elements of the lenses of the present invention may be made from various plastics and composite materials. The refractive index of a material and its adsorption characteristics over the spectral region of interest will typically be significant factors in determining its suitability for use in that region.

Preferably, the lens elements of lenses made in accordance with the teachings herein are made from polyethylene for applications in the 8–14 μm region, and from PCTE or PTFE for applications in the 3–5 μm region. More preferably, for applications in the 8–14 μm region, the lens elements are made from one or more of the infrared-transmitting plastics available from Fresnel Technologies, Inc. (Fort Worth, Tex.) under the brand name POLY IR®, including POLY IR® 1, POLY IR® 2, POLY IR® 3, POLY IR® 4 and POLY IR® 7 infrared-transmitting plastics. More preferably, for applications in the 3–5 μm region of the infrared, the lens elements are made from the plastic available from Fresnel Technologies, Inc. (Fort Worth, Tex.) under the trade name POLY IR® 5 material. The physical and optical properties of these materials are described in the Fresnel Technologies trade publication "POLY IR® Fresnel Lenses for Infrared Wavelengths" (2000), which is available for download at http://www.fresneltech.com/pdf/POLYIR-.pdf and which is incorporated herein by reference in its entirety.

In some embodiments of the lenses described herein, filled polymers may be used in the construction of the lens. Thus, for example, materials may be used which comprise polyethylene, PCTE, PTFE, or combinations of these or other suitable polymers as a matrix or continuous phase, and materials such as zinc selenide, germanium, or combinations of these or other suitable materials as a disperse phase. If the dispersed phase particles are sufficiently small (e.g., less than about ⅓₀ the wavelength of light in the matrix material) and if there are a sufficient number of particles per cubic wavelength, it is possible in some cases to make the filled polymer behave as a medium with an effective index of refraction somewhat between the indices of the continuous and dispersed phases along any given axis. Hence, filled polymers offer a means by which the refractive index of a polymer may possibly be increased.

Filled polymers may also be constructed for use in applications where the lens is desired to have polarizing properties. In such embodiments, the disperse phase may have an aspect ratio such that the particles of the dispersed phase are sufficiently small (e.g., less than about ⅓₀ the wavelength of light in the matrix material for the spectral region of interest) along one axis and sufficiently large (e.g., 2–3 times greater than wavelengths of light in the matrix material for the spectral region of interest) along another axis that the material behaves as a polarizer.

G. End Uses

The lenses and thermal imaging devices disclosed herein have many applications in the 3–5 μm and 8–14 μm regions of the spectrum. Some of these applications have become practical for the first time by virtue of the lightweight, inexpensive lenses that may be made in accordance with the teachings herein. Such applications include, but are not limited to, area surveillance for security for homes and businesses, pool safety, continuous industrial process monitoring and maintenance, flaw detection, electrical equipment and systems maintenance, the inspection of building envelopes, flat roofs, boilers and steam systems, underground piping systems, refractory systems, and rotating and process equipment, and night vision for automobile safety, in veterinary and human medicine, for the military, and for law enforcement.

H. Other Elements

The lenses and thermal imaging devices described herein may contain various other elements and features. Thus, for example, each element may be provided with one or more antireflective layers, though such layers will typically not be necessary because of the low refractive indices of the available plastic materials. The elements and other components may also be treated or coated with materials that impart scratch-resistance or anti-soiling properties to these elements. The lenses may further be provided with polarizing elements.

The lens elements may also be treated with various dyes, pigments or tints which may be employed, for example, to selectively absorb certain wavelengths of light or to give the lens elements a desired color. Some non-limiting examples include zinc oxide (ZnO), zinc sulfide (ZnS), phthalocyanines, and various mixtures or combinations of these materials. These dyes, pigments or tints may be applied homogeneously throughout the material used to make the lens elements, or may be selectively applied to particular surfaces or features of the lens elements. Examples of the later include draft blackening, which can be useful in some embodiments for eliminating ghosting.

The imaging devices described herein may also be provided with one or more mirrors, reflective surfaces, or other reflective elements. In some embodiments, these reflective elements may be used to alter the orientation or sequence of the lens elements within the optical path. Such reflective elements may also be used where necessary to deploy a given lens within the body of a given device or to adapt the lens to a given design framework or chassis. Moreover, while the preferred embodiment of the lenses and imaging devices described herein employ only two lens elements, it will be appreciated that the principles set forth herein could also be applied to lenses and devices which employ a greater number of elements.

Devices may also be designed in accordance with the teachings herein which contain more than one lens. An example of the latter would be an imaging device having first and second lenses, wherein the first lens is optimized to sense thermal radiation in the 3–5 μm region of the spectrum and the second lens is optimized to sense thermal radiation in the 8–14 μm region of the spectrum. In such a case, the two lenses may be constructed from different materials and may have Fresnel surfaces with different designs, and a means may be provided to alter or direct the optical path between the two lens or to selectively move the lenses into or out of the optical path.

I. Fresnel Surfaces

In the preferred embodiment of the lenses disclosed herein, the grooves all extend to the same depth and have surfaces that are fully aspheric. However, various lenses and imaging devices may also be produced in accordance with the teachings herein in which the grooves extend to different depths, or in which the surfaces of the grooves have other desired shapes or profiles. Thus, for example, the grooves may be of substantially constant width or depth or a combination of the two, and may be conical, spherical, toroidal, or fully aspheric in cross-section, or may have a cross-sectional shape which is a combination of the aforementioned shapes.

The details of the Fresnel surfaces in the lenses and devices described herein may also be varied in accordance with the intended end use of the lens or device. Thus, for example, the depths of the typically concentric grooves of the Fresnel surface may be constant as noted above, or may be varied randomly or in accordance with some algorithm or formula. Also, the grooves may have various angular offsets, which will typically be selected to optimize the desired optical properties of the lens. Moreover, the design of the Fresnel surface may vary from one portion of the surface to another. For example, the surface may contain catadioptric and dioptric grooves and a bull's eye lens which are all independently designed.

J. Methods of Manifacture

The lenses, and the components thereof, which are described herein may be fabricated through various methodologies. The lens elements of these lenses (for example, elements 13 and 15 of FIG. 2) are preferably injection molded, but could also be fabricated, in whole or part, through compression molding, injection compression molding (also called coining), cell casting, continuous casting, high precision molding, discrete embossing, continuous embossing, and diamond machining.

K. Focal Lengths

The Fresnel lenses and lens elements thereof which are described herein may be designed with various focal lengths, both for the lens elements themselves and for the lens as a whole. Typically, for many present applications, the lens as a whole will be designed to have a focal length within the range of about 25 mm to about 50 mm. However, the lens may be designed with higher or lower focal lengths as well. For example, it is desirable in many applications to minimize the size of the sensor array and therefore the pixel size of the device, since a smaller sensor array typically has less thermal mass and thus has the potential to offer faster response times. If pixel size is reduced, then it would also be desirable in many applications to utilize a lens having a shorter focal length with the sensor array.

It should also be noted that, while all of the particular examples and embodiments depicted in the drawings herein feature lenses having fixed focal lengths, the principles set forth herein could also be applied to lens having an adjustable focal length, e.g., a zoom lens.

M. Drive Mechanisms

Various drive mechanisms may be used in the imaging devices described herein for adjusting the distance between the lens elements or for adjusting the orientation of one or both lens elements. These drive mechanisms may be operated manually and/or automatically, and may be under the control of a microprocessor or other such device. Moreover, these drive mechanisms may operate on only one of the lens elements (i.e., the other lens element or elements may be stationary), or may operate on multiple lens elements in a consecutive or simultaneous fashion.

If the drive mechanism operates on multiple lens elements simultaneously, it need not move each lens element at the same speed or in the same manner. For example, in some embodiments, the drive mechanism may be programmed or adapted to move one of the lens elements at some fraction of the speed that it moves another lens element. The drive mechanism may also be adapted to maintain a fixed orientation or distance between two or more lens elements along one or more axes, while changing the relative orientation or distance between the lens elements along another axis.

The imaging devices disclosed herein are not particularly limited to any particular choice of drive mechanism. For example, the drive mechanism may employ a screw drive, a cable system, a belt, or combinations of these devices.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed solely in reference to the appended claims.

What is claimed is:

1. An infrared imaging device, comprising:
first and second plastic Fresnel lens elements, wherein said first and second lens elements are in optical communication with each other, and wherein each of said first and second lens elements has a first major surface which is convex and a second major surface which comprises a Fresnel surface;
wherein said first lens element is adapted to mimic a meniscus asphere correct for conjugates of infinity and for the focal length of said first lens element, and wherein said second lens element is adapted to mimic a meniscus asphere and is further adapted to act as a field flattener.

2. The infrared imaging device of claim 1, wherein said first and second lens elements are disposed in a housing, and wherein said first and second lens elements are arranged within said housing such that they are in optical communication with each other and such that the first major surface of each of said first and second lens elements faces the scene being imaged.

3. The infrared imaging device of claim 1, wherein the Fresnel surface of said first lens element comprises a series of grooves that are convex in a cross-section taken along a plane perpendicular to the second major surface of the lens element.

4. The infrared imaging device of claim 1, wherein the Fresnel surface of said second lens element transitions from a first series of grooves that are concave in a cross-section taken along a plane perpendicular to the second major surface of the lens element, to a second series of grooves that are essentially flat in a cross-section taken along a plane perpendicular to the second major surface of the lens element.

5. The infrared imaging device of claim 2, wherein said first lens element is disposed closer to the scene being imaged than said second lens element.

6. The infrared imaging device of claim 2, wherein said first lens element is disposed closer to the scene being imaged than said second lens element, and wherein the focal length of said first lens element is longer than the combined focal length of said first and second lens elements.

7. The infrared imaging device of claim 2, further comprising a focusing mechanism adapted to move the first and second lens elements toward or away from the image side of the device.

8. The infrared imaging device of claim 1, wherein said first and second lens elements comprise high density polyethylene.

9. The infrared imaging device of claim 1, wherein said first and second lens elements are adapted to operate in the 3–5 μm region of the spectrum.

10. The infrared imaging device of claim 1 wherein said first and second lens elements are adapted to operate in the 8–14 μm region of the spectrum.

11. The infrared imaging device of claim 1, wherein said first and second lens elements each comprise a material selected from the group consisting of polytetrafluoroethylene (PTFE) and polychlorotrifluoroethylene (PCTE).

12. The infrared imaging device of claim 1, wherein said first and second lens elements are arranged along a common optical axis.

13. An infrared imaging lens, comprising:
first and second plastic lens elements, each of said lens elements having a first major surface which is convex and a second major surface which comprises a Fresnel surface;
wherein the Fresnel surface of at least one of the first and second lens elements comprises a series of grooves that are convex in a cross-section taken along a plane perpendicular to die second major surface of the lens element.

14. The infrared imaging device of claim 13, wherein the Fresnel surface of said first lens element comprises a series of grooves that are convex in a cross-section taken along a plane perpendicular to the second major surface of the lens element.

15. The infrared imaging device of claim 13, wherein the Fresnel surface of said second lens element transitions from a first series of grooves that are concave in a cross-section taken along a plane perpendicular to the second major surface of the lens element, to a second series of grooves that are essentially flat in a cross-section taken along a plane perpendicular to the second major surface of the lens element.

16. The lens of claim 13, wherein said first lens element is adapted to act as a meniscus asphere which is correct for conjugates of infinity and its focal length.

17. The lens of claim 13, wherein said first lens element is adapted to act as a meniscus asphere which is correct for the focal length of the first element, and wherein the focal length of the first lens element is longer than the combined focal length of the first and second lens elements.

18. The lens of claim 17, wherein the second lens element is also adapted to act as a meniscus asphere, and wherein the second lens element is further adapted to act as a field flattener.

19. The lens of claim 13, wherein said second lens element has positive power.

20. An infrared imaging device, comprising:
first and second plastic lens elements, each having a first major surface which is convex and a second major surface which comprises a Fresnel surface that comprises a series of grooves, wherein each of said grooves is aspherical in a cross-section taken along a plane perpendicular to the length of the groove;
a chassis which supports said first and second lens elements in a fixed orientation with respect to each other along a longitudinal axis;
a mechanism adapted to adjust the distance between the first and second lens elements along the longitudinal axis; and
a focal plane array detector;
wherein said first and second lens elements are arranged within said chassis such that they are in optical communication with each other and such that their first major surfaces face away from the focal plane array detector.

21. The infrared imaging device of claim 20, wherein each Fresnel surface of each of said first and second lens elements comprises a series of grooves that are convex in a cross-section taken along a plane perpendicular to the second major surface of the lens element.

22. The infrared imaging device of claim 20, wherein said second lens element is disposed closer to the focal plane array than said first lens element, and wherein said first lens element is adapted to act as a meniscus asphere which is correct for conjugates of infinity.

23. The infrared imaging device of claim 20, wherein said first lens element is disposed farther from the focal plane may than said second lens element, wherein said first lens element is adapted to act as a meniscus asphere which is correct for conjugates of infinity and its focal length, and wherein the focal length of the first lens element is longer than the combined focal length of the first and second lens elements.

24. The infrared imaging device of claim 23, wherein said second lens element is also adapted to act as a meniscus asphere, and wherein said second lens element is further adapted to act as a field flattener.

25. The infrared imaging device of claim 23, wherein said second lens element has positive power.

26. The infrared imaging device of claim 23, wherein said first and second lens elements comprise high density polyethylene.

27. The infrared imaging device of claim 26, wherein said first and second lens elements are adapted to operate in the 8–14 μm region of the spectrum.

28. The infrared imaging device of claim 20, wherein said first and second lens elements each comprise a material selected from the group consisting of polytetrafluoroethylene (PTFE) and polychlorotrifluoroethylene (PCTE).

29. A method for making an infrared thermal imaging device, comprising the steps of:
  shaping first and second lens elements from a softened polymeric composition such that said first and second lens elements each have a first major surface which is convex and a second major surface which comprises a Fresnel surface that contains a series of grooves, each of which is aspherical in a cross-section taken along a plane perpendicular to the length of the groove; and
  disposing the first and second lens elements in a housing equipped with a focal plane array such that said first and second lens elements are in optical communication with each other and have their first major surfaces facing away from the focal plane array.

30. The method of claim 29, wherein the first and second lens elements are molded from a molten polymeric composition.

31. The method of claim 29, wherein the first and second lens elements are molded from a thermally softened polymeric composition.

32. The method of claim 29, wherein the first and second lens elements are cast by thermally, optically, or chemically catalyzed polymerization.

* * * * *